March 26, 1929. W. N. WINNETT 1,706,508
GARTER
Filed Oct. 17, 1927
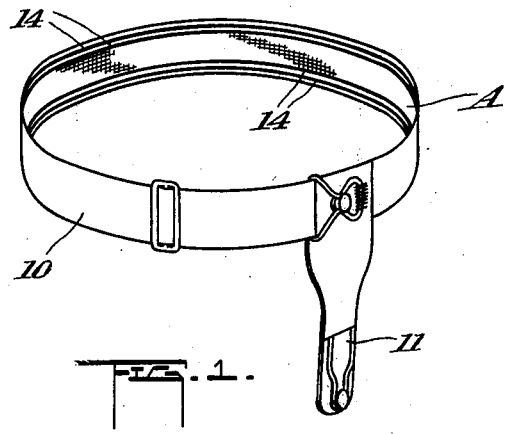
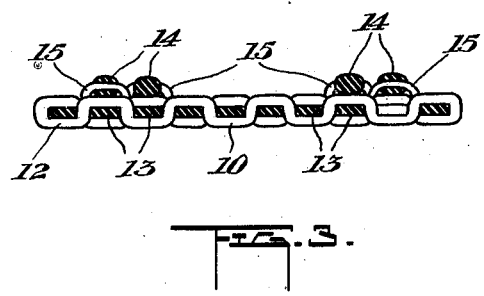
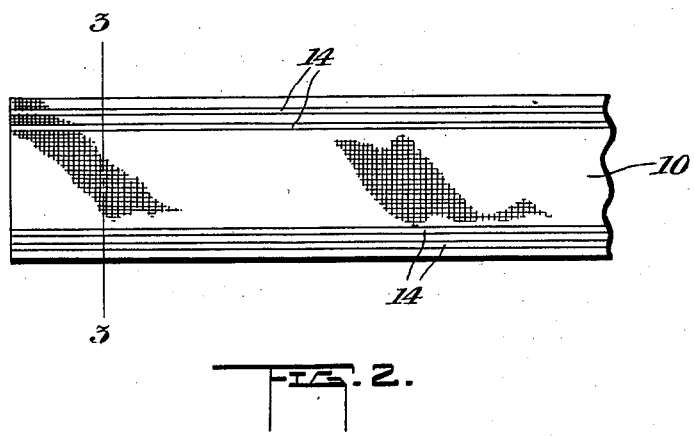
INVENTOR.
WILLARD. N. WINNETT.
BY Smart & Biggar.
ATTORNEYS.

Patented Mar. 26, 1929.

1,706,508

UNITED STATES PATENT OFFICE.

WILLARD NORTH WINNETT, OF TORONTO, ONTARIO, CANADA, ASSIGNOR TO THE CURRIE MANUFACTURING COMPANY LIMITED, OF TORONTO, ONTARIO, CANADA.

GARTER.

Application filed October 17, 1927. Serial No. 226,756.

This invention relates to improvements in garters, and the objects of the invention are to prevent slipping of the webbing of the garter with respect to the stocking or the leg of the wearer.

In the manufacture of garters, particularly men's garters, it has been the practice to make such garters of elastic webbing and in some instances to provide on the inner surface of the webbing anti-friction material such as rubber. Difficulties are encountered, however, in applying such material to the webbing and maintaining it in place, and it is also a source of some discomfort. The present invention overcomes these difficulties by forming the webbing of which the garter is to be made with preferably a plurality of longitudinally extending spaced rubber strands, as hereinafter set forth and described more fully in the accompanying specification and drawing.

In the drawings like characters of reference indicate corresponding parts in each figure.

In the drawings:

Figure 1 is a perspective view of a garter embodying the invention.

Figure 2 is a plan view of a portion of the webbing from which the garter is formed.

Figure 3 is a section on the line, 3—3, Figure 2.

Referring to the drawings, A indicates a garter of any convenient form or shape, the construction of which in general, apart from the webbing, does not form part of the present invention. It includes a band 10 to encircle the leg of the wearer, and an attaching device 11 by which the garter is attached to the hose which it is designed to support. In accordance with the present invention the webbing 10 is of elastic material comprising interwoven cotton, linen or silk thread and elastic thread. As shown in Figure 3, it will be seen that the outer threads 12 of the webbing, which may be of cotton, silk or linen, surround the usual inner elastic threads 13, and therefore cover them and prevent contact between the same and the surface to which the garter is applied. In addition to these rubber threads, however, I provide on the webbing spaced longitudinal strands or threads 14 of bare rubber connected to the main portion of the band by threads 15 which extend through the same and through the webbing at intervals. In the embodiment illustrated, two parallel bands 14 are provided at each side of the webbing.

It will be found that in a garter of the kind described, the strands of bare rubber will enable a firm and yet comfortable grip to be maintained without likelihood of misplacement.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

In a garter, a flexible webbing comprising inelastic threads and rubber threads, interwoven therewith and covered by said inelastic threads, and a plurality of bare rubber threads extending about the garter and exposed on the inner face thereof, said bare rubber threads secured to the garter by auxiliary threads extending through the bare rubber threads and through the webbing.

In witness whereof I have hereunto set my hand.

WILLARD NORTH WINNETT.